United States Patent

(12) United States Patent
Jo

(10) Patent No.: US 8,050,497 B2
(45) Date of Patent: Nov. 1, 2011

(54) IMAGE PROCESSING APPARATUS AND CONTROL METHOD THEREOF

(75) Inventor: Gye-wook Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 909 days.

(21) Appl. No.: 12/043,479

(22) Filed: Mar. 6, 2008

(65) Prior Publication Data

US 2008/0310711 A1 Dec. 18, 2008

(30) Foreign Application Priority Data

Jun. 12, 2007 (KR) .................. 10-2007-0057475

(51) Int. Cl.
 *G06K 9/00* (2006.01)
 *G06K 9/40* (2006.01)
(52) U.S. Cl. ......... 382/167; 382/162; 382/254; 382/274
(58) Field of Classification Search .................. 382/162, 382/167, 254, 274
 See application file for complete search history.

(56) References Cited

U.S. PATENT DOCUMENTS

| 2001/0053248 | A1* | 12/2001 | Maeda ......................... 382/165 |
| 2004/0196408 | A1* | 10/2004 | Ishikawa et al. .............. 348/616 |
| 2005/0219574 | A1  | 10/2005 | Ok et al. |
| 2007/0229675 | A1* | 10/2007 | Nishide ....................... 348/222.1 |

FOREIGN PATENT DOCUMENTS

| KR | 10-2005-0023652 A | 3/2005 |
| KR | 10-2005-0049007 B1 | 5/2005 |
| KR | 10-2006-0093821 A | 8/2006 |

* cited by examiner

*Primary Examiner* — Bhavesh Mehta
*Assistant Examiner* — Bernard Krasnic
(74) *Attorney, Agent, or Firm* — Sughrue Mion, PLLC

(57) ABSTRACT

An image processing apparatus, includes: a contrast enhancer which changes a color coordinate value of a color correction region in an image signal, which corresponds to a color to be corrected within the image signal, to a corrected color coordinate value in a range to perform a color correction; and a controller which determines a difference between the color coordinate values before and after the color correction by the contrast enhancer, and controls the contrast enhancer to output the image signal having the unchanged color coordinate value if the difference is greater than or equal to a reference value.

9 Claims, 3 Drawing Sheets

IMAGE PROCESSING APPARATUS AND CONTROL METHOD THEREOF

CROSS-REFERENCE TO RELATED APPLICATIONS

This application claims priority from Korean Patent Application No. 10-2007-0057475, filed on Jun. 12, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to image processing, and more particularly, to image processing which improves a quality of an image signal.

2. Description of the Related Art

An image processing apparatus, such as a television (TV) and a monitor, displays an image with red (R), green (G) and blue (B) colors.

To improve the quality of a displayed image by adjusting a display state of the image, RGB image signals which are supplied to the image processing apparatus are converted into HSV image signals to respectively process hue (H), saturation (S) and value or brightness (V) thereof More specifically, saturation and/or hue components are increased or decreased to adjust the color of an image.

Korean Patent Publications No. 2005-0023652 and No. 2006-0093821 which have been filed by the assignee of the instant application disclose a display apparatus and an apparatus for adjusting color of an input image selectively and a method thereof, which convert a color distributed in a predetermined domain of a color space and adjust the color.

A memory color such as a skin color, sky-blue color and grass-green color is displayed most frequently, and it is most familiar to human eyes.

Since a user is more sensitive to a change in the memory color than other colors, it is necessary to adjust a display state of the memory color more precisely to prevent color distortion, e.g., due to excessive color change and to enhance the viewer's experience.

SUMMARY OF THE INVENTION

The present invention provides an image processing apparatus which prevents color distortion due to excessive color change and improves quality of an image when adjusting a display state of an image signal, and a control method thereof According to an aspect of the present invention, there is provided an image processing apparatus, including: a contrast enhancer which changes a color coordinate value of a color correction region in an image signal, which corresponds to a predetermined color to be corrected within the image signal, to a corrected color coordinate value in a predetermined range to perform a color correction; and a controller which determines a difference between the color coordinate values before and after the color correction by the contrast enhancer, and controls the contrast enhancer to output the image signal having the unchanged color coordinate value if the difference is greater than or equal to a predetermined reference value.

The image signal maybe an RGB (red, green, blue) image signal, and the contrast enhancer may convert the RGB image signal into an HSV (hue, saturation, value) image signal.

The controller may extract the difference between the color coordinate values before and after color correction for each frame of the image signal, determine an average value of the extracted differences between the color coordinate values, and output the image signal having the unchanged color coordinate value if the determined average value is greater than or equal to the predetermined reference value.

The image processing apparatus may further include a user input unit which is provided to input a target color coordinate value for a second predetermined color, and a color converter which converts the color coordinate value of the image signal input by the contrast enhancer into the target color coordinate value, wherein the controller controls the color converter to convert the color coordinate value of the image signal for a predetermined color region defined as a group of colors neighboring the second predetermined color, to the target color coordinate value.

The color converter may convert the HSV image signal into a YUV image signal.

The controller may control the color coordinate value of the color correction region for each frame, the color coordinate value being output by the color converter as the converted YUV image signal, to be supplied as a feedback to the contrast enhancer.

The controller may convert the converted YUV image signal into an HSV image signal to be supplied to the contrast enhancer.

The image processing apparatus may further include a display unit which displays an image based on the image signal output by the contrast enhancer.

According to another aspect of the present invention, there is provided a method of controlling an image processing apparatus, the method including: correcting a color in an image signal by changing a color coordinate value of a color correction region in the image signal, which corresponds to a predetermined color to be corrected within the image signal, to a corrected color coordinate value in a predetermined range; determining a difference between the color coordinate values before and after the correcting the color; and outputting the image signal having the unchanged color coordinate value if the difference is greater than or equal to a predetermined reference value.

The image signal may be an RGB (red, green, blue) image signal, and the correcting the color may further include converting the RGB image signal into an HSV image signal.

The determining the difference includes extracting the difference between the color coordinate values before and after color correction for each frame of the image signal, and determining an average value of the extracted differences between the color coordinate values.

The method may further include, after the outputting the image signal, receiving a target color coordinate value for a second predetermined color, and converting the color coordinate value of the image signal distributed within a predetermined color region defined as a group of colors neighboring the second predetermined color into the target color coordinate value.

The method may further include supplying as a feedback the color coordinate value of the predetermined color correction region of each frame, after converting of the color coordinate value into the target color coordinate value, to the correcting the color step.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS

Figure 1:
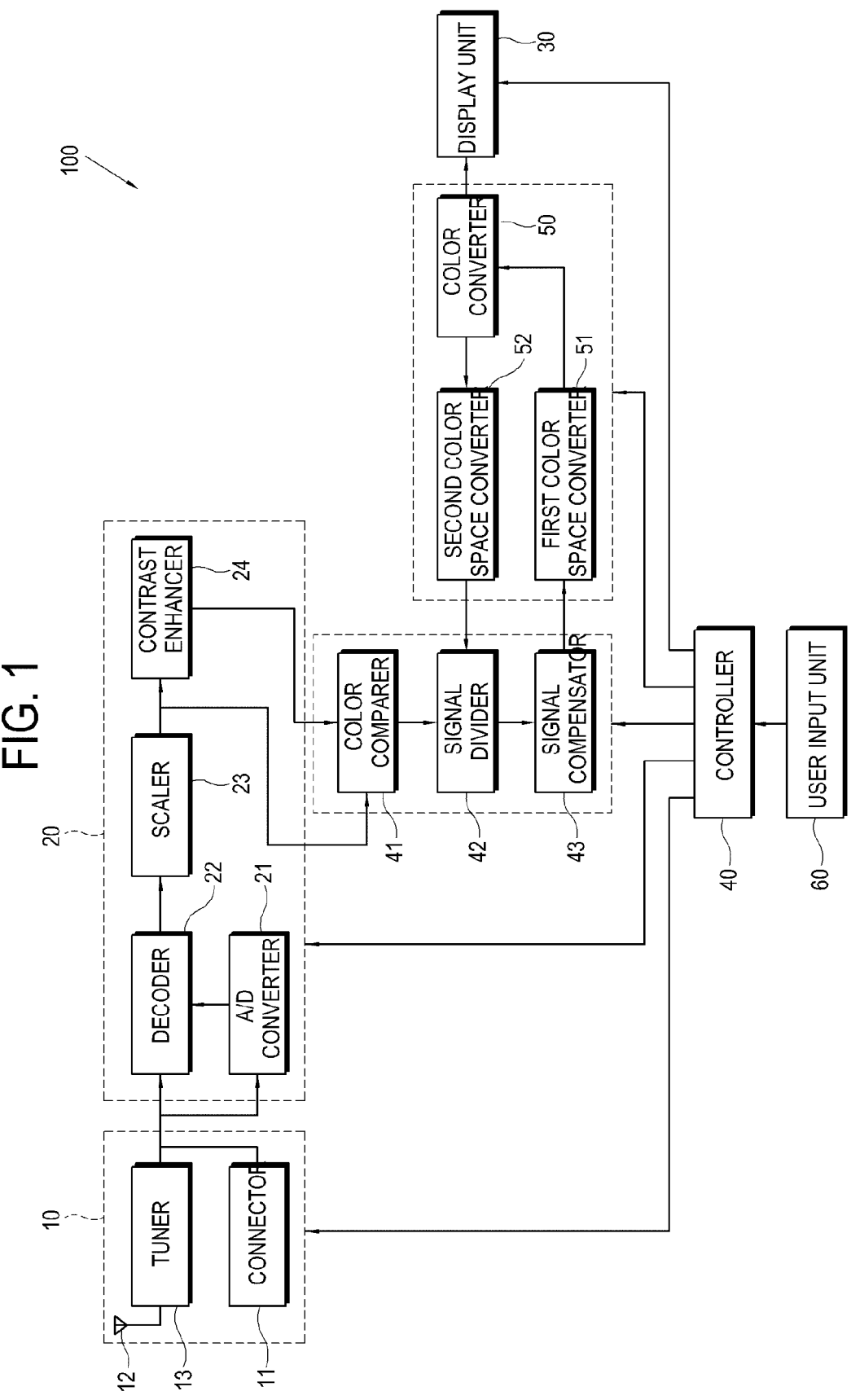
FIG. 1 is a block diagram of an image processing apparatus according to an exemplary embodiment of the present invention.

Hereinafter, exemplary embodiments of the present invention will be described with reference to accompanying drawings, wherein like reference numerals refer to like elements and repetitive descriptions will be avoided as necessary. The present invention, however, may be realized via various implementations, and is not limited to the exemplary embodiments.

FIG. 1 is a block diagram of an image processing apparatus 100 according to an exemplary embodiment of the present invention. The image processing apparatus 100 according to the exemplary embodiment of the present invention may be embodied by a display apparatus such as a digital TV, a monitor, and other known display apparatuses in the art.

More specifically, the image processing apparatus 100 may be connected with a video device including a computer system such as a personal computer (PC) to receive an image signal, tune a digital broadcasting signal and analog broadcasting signal received through an antenna to divide the signals into an image signal and an audio signal, and process the received image signal to display an image.

As shown in FIG. 1, the image processing apparatus 100 according to the exemplary embodiment of the present invention includes a signal receiver 10, an image processor 20, a display unit 30 and a controller 40.

The signal receiver 10 receives an image signal from a video device. Here, the received image signal may include RGB (red, green and blue) signals.

The signal receiver 10 may include at least one connector 11 depending on the type of the received image signal. The connector 11 may include a D-sub connector corresponding to an analog image signal, and a Digital Video Interactive (DVI) connector corresponding to a digital image signal.

The signal receiver 10 may include an antenna 12 which receives a broadcasting signal, and a tuner 13 which tunes the received broadcasting signal into a broadcasting signal having a corresponding frequency band, according to a predetermined tuning control signal. The tuned broadcasting signal is output in a transport stream through a Vestigial SideBand (VSB) demodulation process by a demodulator (not shown) and error correction process. A demultiplexer (not shown) divides the tuned broadcasting signal of a transport stream into an image signal, an audio signal and various additional data to output a bit stream signal.

The image processor 20 processes the image signal received from the signal receiver 10, according to the type of the image signal. The image processor 20 may include an analog/digital (A/D) converter 21, a decoder 22, a scaler 23, a contrast enhancer 24, etc.

The contrast enhancer 24 changes a color coordinate value of a color correction region, which corresponds to a predetermined color to be corrected within the image signal in a predetermined range, and performs enhancing of the quality of the image.

More specifically, the contrast enhancer 24 converts the RGB image signal into an HSV image signal, and then changes the color coordinate value of the converted HSV domain to a predetermined range. The HSV image signal has a basic composition of hue H, saturation S and value or brightness V.

The contrast enhancer 24 converts the RGB image signal into the HSV image signal to detect information on hue and saturation unknown in the RGB image signal, and adjusts display range of the color to be corrected, based on the detected information on hue and saturation.

Here, the color to be corrected may include one of a skin color, a sky-blue color and a grass-green color which are frequently displayed through the image processing apparatus 100. Each of the skin color, sky-blue color and grass-green color are memory colors which are most familiar to human eyes. Thus, a user may be more sensitive to a change in those colors than in others.

Thus, the contrast enhancer 24 detects the information on hue and saturation of the color to be corrected if the received frame includes a color corresponding to the color correction region, and corrects the color coordinate value in the color correction region of the detected information on the hue and saturation, thereby adjusting brightness and luminance and enhancing the quality of the image.

The contrast enhancer 24 converts the RGB image signal into a YUV image signal, and divides the color to be corrected into luminance (Y) and chrominance (C) components to perform processing that enhances the quality of the image.

The display unit 30 displays the image based on the image signal processed by the image processor 20. The display unit 30 may include a liquid crystal display (LCD) or a plasma display panel (PDP).

The controller 40 controls overall operation of the image processing apparatus 100.

More specifically, the controller 40 calculates a difference between the color coordinate values of the color correction region before and after the contrast enhancer 24 adjusts the color. If the calculated difference is a predetermined reference value or above, the controller 40 controls the display unit 30 to display an image signal having the unchanged color coordinate value.

The image processing apparatus 100 may further include a color comparer 41 which extracts the difference between the color coordinate values before and after the color correction for each frame of the image signal and calculates an average value of the extracted differences, a signal divider 42 which compares the calculated average value with the predetermined reference value, and separates the image signal which was corrected by the contrast enhancer 24 from the image signal before correction, based on the comparison result, and a signal compensator 43 which selectively outputs one of the image signals before and after the correction, based on the comparison result between the calculated average value and the predetermined reference value.

The color comparer 41 receives the image signal before correction (H1_before, H2_before, . . . , Hn_before) and the image signal after correction (H1_after, H2_after, . . . , Hn_after) for each frame via the scaler 23 and the contrast enhancer 24, extracts the difference ($\Delta H1, \Delta H2, \ldots, \Delta Hn$) of the color coordinate values before and after correction, and calculates the average value ($\Delta H$) of the extracted differences as shown in the Formula 1 below.

$$\Delta H1 = H1\_before - H1\_after,$$

$$\Delta H2 = H2\_before - H2\_after,$$

$$\Delta Hn = Hn\_\text{before} - Hn\_\text{after},$$

$$\Delta H = \text{Average}[\Delta H1 + \Delta H2 + \Delta H3 + \ldots + \Delta Hn]. \quad \text{[Formula 1]}$$

The signal divider 42 compares the average value ΔH of the difference calculated by the color comparer 41 with the predetermined reference value Hth (threshold) according to the Formula 2 shown below, and separates only the the image signal before correction H_before from the corrected image signal if the average value ΔH is greater than or equal to the reference value Hth.

$$\Delta H > Hth. \quad \text{[Formula 2]}$$

Here, the signal divider 42 may sequentially receive the frame of the feedback image signal from a color converter 50 (to be described later), and separate the image signal before correction H_before of the color correction region, from the feedback image signal of each frame.

If the average value ΔH of the difference is greater than or equal to the reference value Hth, the signal compensator 43 outputs the separated image signal before correction H_before. If the average value ΔH of the differences is smaller than the reference value Hth, the signal compensator 43 outputs the image signal after correction H_after.

The operations of the color comparer 41, the signal divider 42 and the signal compensator 43 are controlled by the controller 40.

Figure 2:
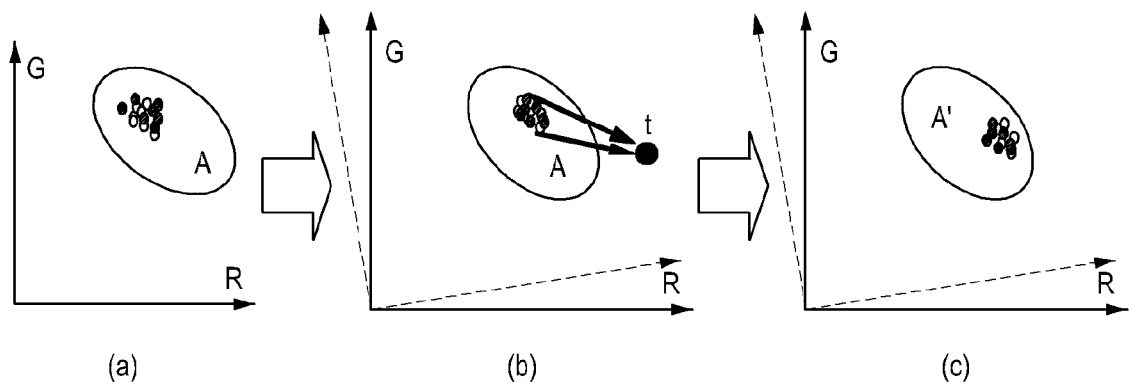
FIG. 2 shows a graph which sequentially illustrates color coordinate values which are changed by color correction according to the exemplary embodiment of the present invention.

FIG. 2 shows a graph which sequentially illustrates the color coordinate values that are changed by the color correction according to the exemplary embodiment of the present invention.

If the skin color is corrected, the color coordinate value being corrected by the contrast enhancer 24 may be divided into a high light (H/L) signal and a low light (L/L) signal depending on brightness, as shown in (a) in FIG. 2.

As shown in (b) in FIG. 2, when the contrast enhancer 24 corrects the color coordinate value of the hue and saturation information, the difference of the color coordinate values of the H/L signal and the L/L signal before and after correction is not greater than or equal to the predetermined reference value ΔH. Thus, the color coordinate values of the H/L and L/L signals are not distanced from each other, thereby preventing distortion of the hue.

For example, the H/L signal included in the skin color by the correction of the color coordinate value may lean toward G coordinates, and the L/L signal lean may toward R coordinates.

In this case, the color coordinate values may be distanced from each other according to how much the H/L signal and the L/L signal lean toward the corresponding coordinates, respectively. Thus, the hue may be distorted.

Accordingly, the contrast enhancer 24 outputs the non-corrected color coordinate values when the difference of the color coordinate values before and after the correction is greater than or equal to the predetermined reference value ΔH, thereby preventing the H/L signal and the L/L signal from being distanced from each other.

The image processing apparatus 100 may further include a user input unit 60 to input a target color coordinate value t for a predetermined color, and the color converter 50 to convert the color coordinate value input by the contrast enhancer 24 into the target color coordinate value t.

The controller 40 controls the color converter 50 to convert the color coordinate value of a predetermined color region A defined as a group of neighboring colors, within the predefined color region A.

Referring to (c) in FIG. 2, the color converter 50 performs a normal stretching without distorting the hue since the corrected image signal output by the contrast enhancer 24 is a signal in which distortion of the hue does not arise.

Here, the controller 40 may control the undistorted color coordinate value of the color converter 50 to be provided to the signal divider 42 or the contrast enhancer 24.

The image signal which is converted by the color converter 50 may include a YUV signal.

The image processing apparatus 100 may further include a first color space converter 51 which converts the HSV image signal output by the contrast enhancer 24 into the RGB image signal, and converts the RGB image signal into the YUV image signal to be output to the color converter 50, and a second color space converter 52 which converts the YUV image signal output by the color converter 50 into the RGB image signal, and converts the RGB image signal into the HSV image signal to be supplied back to the contrast enhancer 24.

Figure 3:
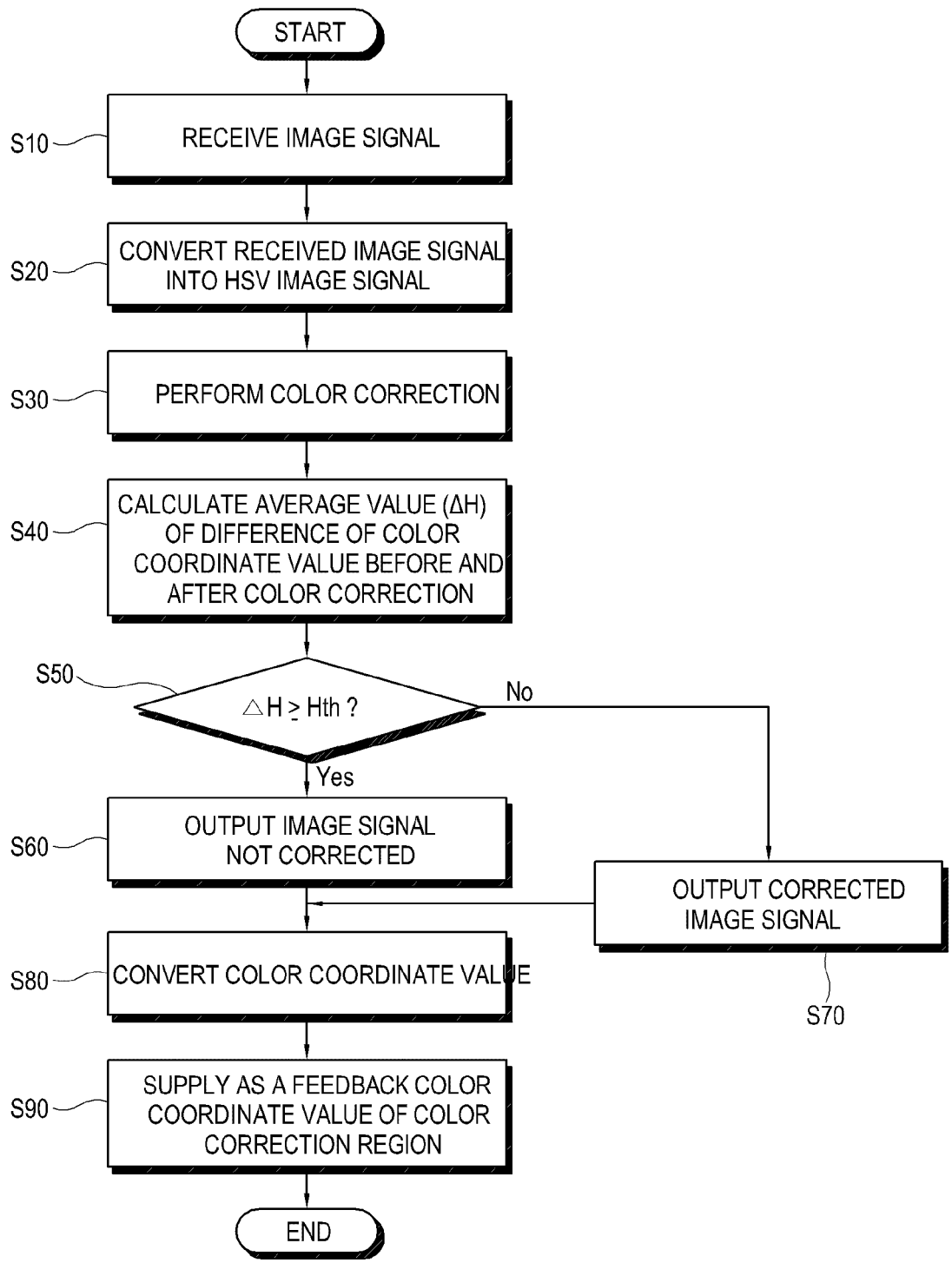
FIG. 3 is a flowchart to describe a control method of the image processing apparatus according to the exemplary embodiment of the present invention.

Hereinafter, a control method of the image processing apparatus 100 having the foregoing configuration according to the exemplary embodiment will be described with reference to FIG. 3.

First, the signal receiver 10 receives the image signal (S10).

The signal receiver 10 may be connected with the video device to receive the image signal, or may receive the broadcasting signal from the antenna 12 to separate the image signal from the received broadcasting signal.

The received image signal may include the RGB image signal.

The controller 40 converts the received RGB image signal into the HSV image signal (S20).

The controller 40 controls the contrast enhancer 24 to change the color coordinate value of the color correction region, which corresponds to the predetermined color to be corrected within the HSV image signal converted at operation S20, in a predetermined range, and adjusts the color (S30).

The controller 40 calculates the difference of the color coordinate values before and after the correction (S40).

The controller 40 extracts the difference between the color coordinate values before and after the correction for the respective frames of the image signal, and may calculate the average value of the extracted differences of the calculated color coordinate values.

Then, the average value of the differences calculated at operation S40 is compared with a predetermined reference value Hth (S50).

If the average value of the differences is determined to be greater than or equal to the reference value Hth in operation S50, the controller 40 controls the contrast enhancer 24 to output the image signal before correction, whose color coordinate value has not been changed (S60).

If the average value of the differences is smaller than the reference value Hth in operation S50, the controller 40 controls the contrast enhancer 24 to output the corrected image signal whose color coordinate value has been changed (S70).

The controller 40 may receive the target color coordinate value t for the predetermined color from the user input unit 60, and may control the color coordinate value distributed within the predetermined color region defined as a group of the neighboring colors to be converted into the received target color coordinate value t (S80).

The controller 40 may sequentially supply as a feedback the color coordinate value of the color correction region converted at operation S80 to the contrast enhancer 24 for each frame (S90).

As described above, the exemplary embodiments of the present invention provide an image processing apparatus which adjusts a display state of an image signal, prevents color distortion due to excessive adjustment, and improves a quality of the image.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus, comprising:
a contrast enhancer which changes a color coordinate value of a color correction region in an image signal, which corresponds to a color to be corrected within the image signal, to a corrected color coordinate value in a range to perform a color correction;
a controller which determines a difference between the color coordinate values before and after the color correction by the contrast enhancer, and controls the contrast enhancer to output the image signal having the unchanged color coordinate value if the difference is greater than or equal to a reference value and to output the image signal having the corrected color coordinate value if the difference is less than the reference value; and
a user input unit which is provided to input a target color coordinate value for another color, and a color converter which converts the color coordinate value of the image signal input by the contrast enhancer into the target color coordinate value,
wherein the controller controls the color converter to convert the color coordinate value of the image signal for a color region defined as a group of colors neighboring the other color, to the target color coordinate value, and
wherein the controller controls the color coordinate value of the color correction region for each frame, the color coordinate value being output by the color converter as the converted image signal, to be supplied as a feedback to the contrast enhancer.

2. The image processing apparatus according to claim 1, wherein the image signal is a red (R), green (G), blue (B) image signal, and the contrast enhancer converts the RGB image signal into a hue (H), saturation (S), value (V) image signal.

3. The image processing apparatus according to claim 1, wherein the controller extracts the difference between the color coordinate values before and after color correction for each frame of the image signal, determines an average value of the extracted differences between the color coordinate values, and outputs the image signal having the unchanged color coordinate value if the determined average value is greater than or equal to the reference value.

4. The image processing apparatus according to claim 1, wherein the color converter converts a hue (H), saturation (S), value (V) image signal into a luminance (Y), color information (UV) image signal.

5. The image processing apparatus according to claim 4, wherein the controller converts the converted YUV image signal into an HSV image signal to be supplied to the contrast enhancer.

6. The image processing apparatus according to claim 1, further comprising a display unit which displays an image based on the image signal output by the contrast enhancer.

7. A method of controlling an image processing apparatus, the method comprising:
correcting a color in an image signal by changing a color coordinate value of a color correction region in the image signal, which corresponds to a color to be corrected within the image signal, to a corrected color coordinate value in a range;
determining a difference between the color coordinate values before and after the correcting the color;
outputting the image signal having the unchanged color coordinate value if the difference is greater than or equal to a reference value;
outputting the image signal having the corrected color coordinate value if the difference is less than the reference value;
receiving a target color coordinate value for another color,
converting the color coordinate value of the image signal distributed within a color region defined as a group of colors neighboring the other color into the target color coordinate value; and
supplying as a feedback the color coordinate value of the color correction region of each frame, after converting of the color coordinate value into the target color coordinate value, to be used in the correcting the color.

8. The method according to claim 7, wherein the image signal is a red (R), green (G), blue (B) image signal, and the correcting the color further comprises converting the RGB image signal into a hue (H), saturation (S), value (V) image signal.

9. The method according to claim 7, wherein the determining the difference comprises extracting the difference between the color coordinate values before and after color correction for each frame of the image signal, and determining an average value of the extracted differences between the color coordinate values.

* * * * *